US012683254B2

(12) United States Patent
Kang et al.

(10) Patent No.: US 12,683,254 B2
(45) Date of Patent: Jul. 14, 2026

(54) POUCH-SHAPED BATTERY CELL HAVING SAFETY ELEMENT PROVIDED BETWEEN ELECTRODE LEAD AND LEAD FILM

(71) Applicant: LG Energy Solution, Ltd., Seoul (KR)

(72) Inventors: Gyung Soo Kang, Daejeon (KR); Jae Ho Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 614 days.

(21) Appl. No.: 18/031,704

(22) PCT Filed: Aug. 26, 2022

(86) PCT No.: PCT/KR2022/012785
§ 371 (c)(1),
(2) Date: Apr. 13, 2023

(87) PCT Pub. No.: WO2023/038338
PCT Pub. Date: Mar. 16, 2023

(65) Prior Publication Data
US 2023/0411810 A1 Dec. 21, 2023

(30) Foreign Application Priority Data

Sep. 13, 2021 (KR) ........................ 10-2021-0121677

(51) Int. Cl.
*H01M 50/581* (2021.01)
*H01M 50/105* (2021.01)
(Continued)

(52) U.S. Cl.
CPC ....... *H01M 50/581* (2021.01); *H01M 50/105* (2021.01); *H01M 50/188* (2021.01); *H01M 50/193* (2021.01)

(58) Field of Classification Search
CPC .................................................. H01M 50/105
See application file for complete search history.

(56) References Cited

U.S. PATENT DOCUMENTS

2004/0110061 A1* 6/2004 Haug .................... H01M 10/48
429/185
2005/0260486 A1 11/2005 Cho et al.
(Continued)

FOREIGN PATENT DOCUMENTS

CN 105684183 A 6/2016
CN 205921041 U 2/2017
(Continued)

OTHER PUBLICATIONS

KR-20010077684-AandTranslation (Year: 2001).*
(Continued)

*Primary Examiner* — Brian R Ohara
(74) *Attorney, Agent, or Firm* — Lerner David LLP

(57) ABSTRACT

The present invention relates to a pouch-shaped battery cell including an electrode assembly having an electrode lead joined thereto, a pouch case configured to receive the electrode assembly, the pouch case having a sealed portion for sealing formed at an outside thereof, and a lead film interposed between the electrode lead and an inner surface of the pouch case at the sealed portion, wherein the pouch-shaped battery cell includes a safety element interposed between the electrode lead and the lead film, the safety element being configured to absorb energy in the battery cell, thereby discharging the battery cell, when the battery cell is overheated to a predetermined temperature or higher.

19 Claims, 4 Drawing Sheets

100

(51) Int. Cl.
    *H01M 50/188*     (2021.01)
    *H01M 50/193*     (2021.01)

(56)          References Cited

U.S. PATENT DOCUMENTS

| | | | |
|---|---|---|---|
| 2006/0043935 A1 | 3/2006 | Chang et al. | |
| 2010/0055564 A1* | 3/2010 | Tokunaga | H01M 4/366 |
| | | | 427/58 |
| 2011/0086253 A1 | 4/2011 | Pompetzki et al. | |
| 2012/0231307 A1 | 9/2012 | Ha | |
| 2013/0011722 A1 | 1/2013 | Ahn | |
| 2017/0005302 A1* | 1/2017 | Muroi | H01M 50/562 |
| 2020/0035966 A1* | 1/2020 | Jin | H01M 50/548 |
| 2020/0251713 A1 | 8/2020 | Park et al. | |
| 2021/0083341 A1 | 3/2021 | Lee et al. | |

FOREIGN PATENT DOCUMENTS

| | | | |
|---|---|---|---|
| CN | 111279544 A | 6/2020 | |
| CN | 113054329 A | 6/2021 | |
| JP | 2007533074 A | 11/2007 | |
| JP | 2008507248 A | 3/2008 | |
| JP | 2011065798 A | 3/2011 | |
| JP | 2011519124 A | 6/2011 | |
| JP | 2016126880 A | 7/2016 | |
| JP | 2016171035 A | 9/2016 | |
| JP | 2016225118 A | 12/2016 | |
| KR | 20010077684 A | 8/2001 | |
| KR | 20040036550 A | 4/2004 | |
| KR | 20080099227 A | 11/2008 | |
| KR | 20090098522 A | 9/2009 | |
| KR | 101121282 B1 | 3/2012 | |
| KR | 20130005441 A | 1/2013 | |
| KR | 101254865 B1 | 4/2013 | |
| KR | 20150033281 A | 4/2015 | |
| KR | 20150045241 A | 4/2015 | |
| KR | 20150054202 A | 5/2015 | |
| KR | 101671486 B1 | 11/2016 | |
| KR | 101770334 B1 | 8/2017 | |
| KR | 102261683 B1 | 6/2021 | |

OTHER PUBLICATIONS

International Search Report for Application No. PCT/KR2022/012785 mailed Nov. 22, 2022, pp. 1-3.

Extended European Search Report including Written Opinion Application No. 22867607.8, dated Jan. 14, 2025, 7 pages.

Search Report dated Aug. 8, 2025 from the Office Action for Chinese Application No. 202280006755.5 issued Aug. 11, 2025. 3 pgs.

* cited by examiner

【FIG. 1】
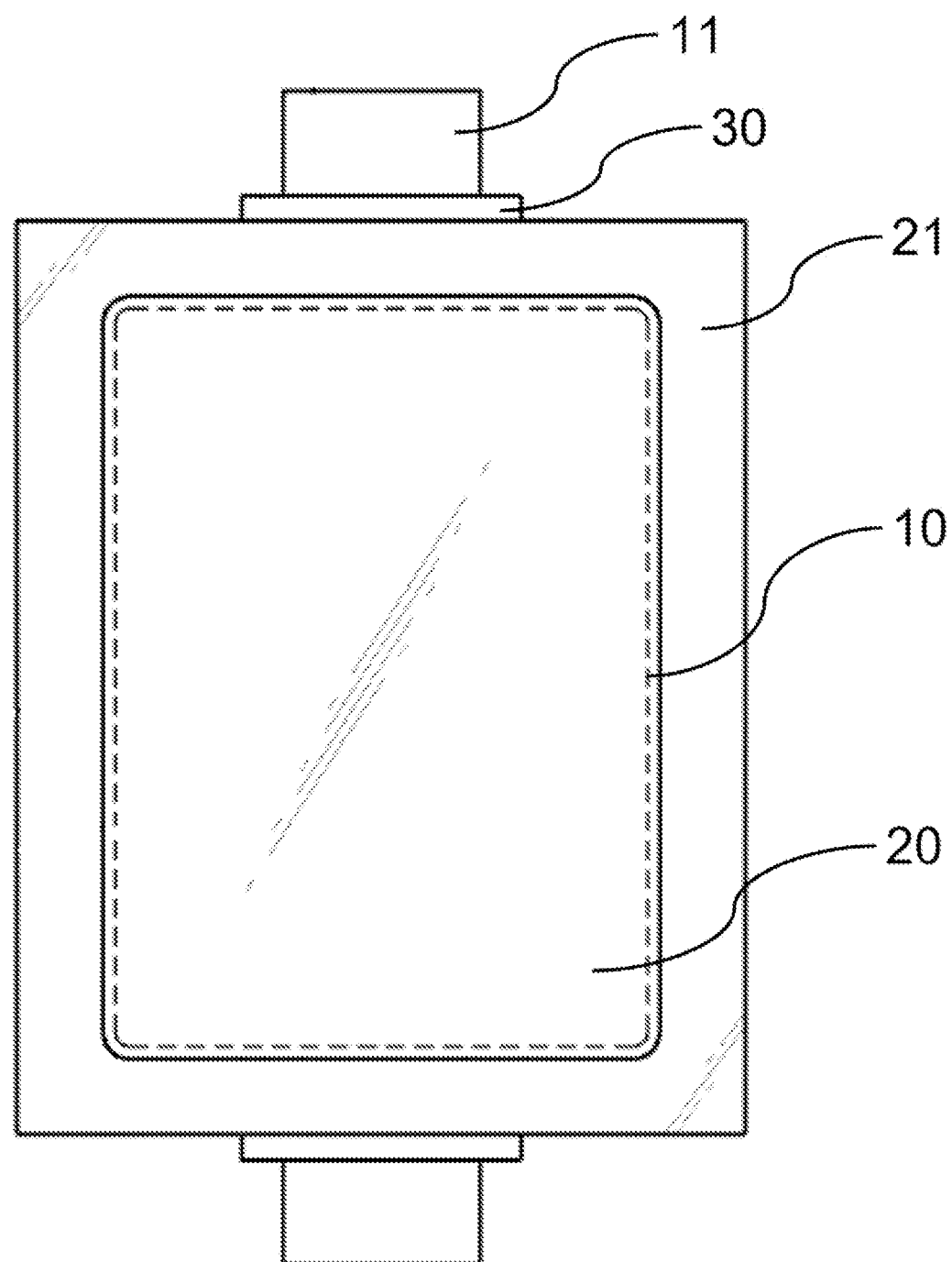
PRIOR ART

【FIG. 2】
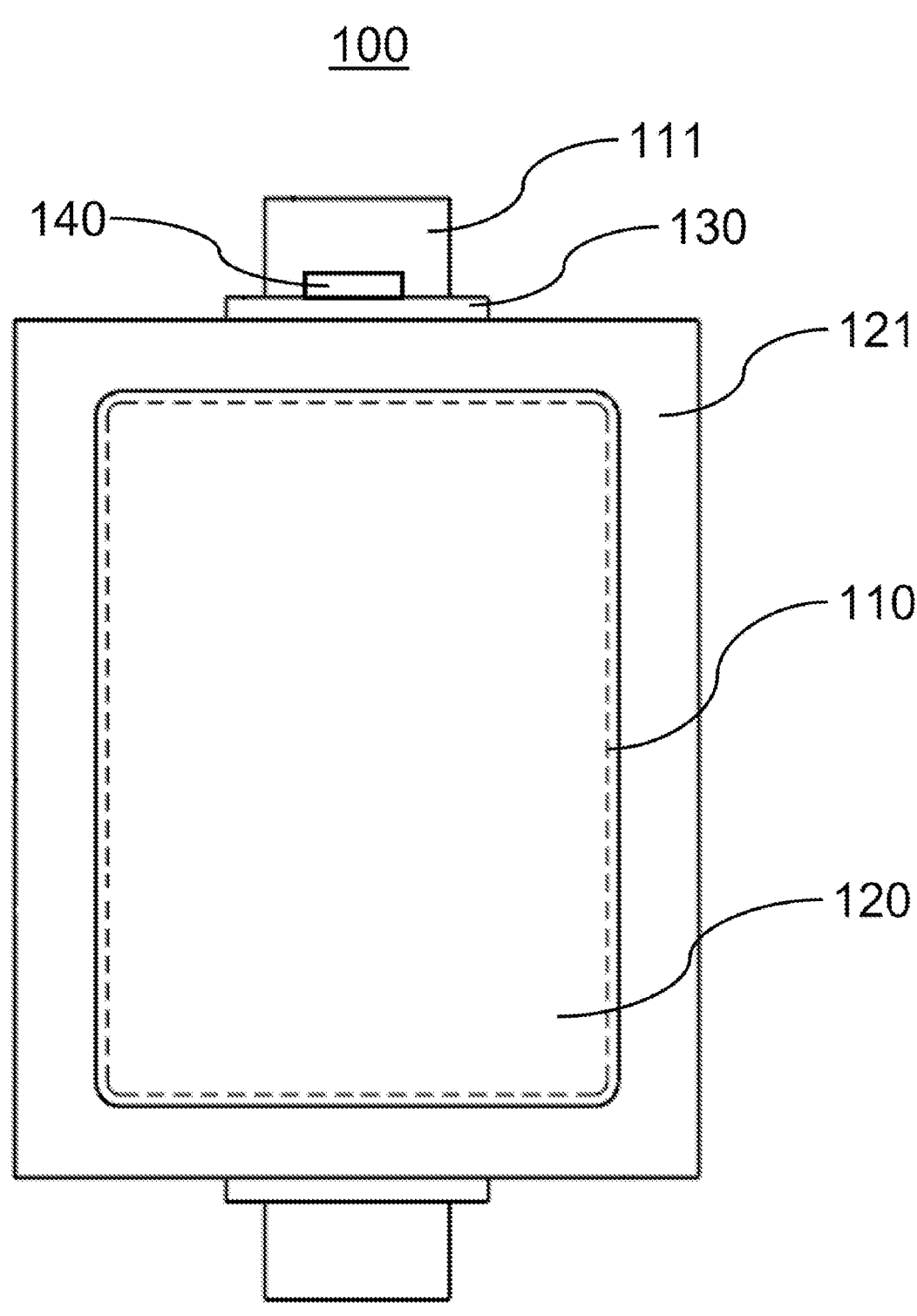

【FIG. 3】
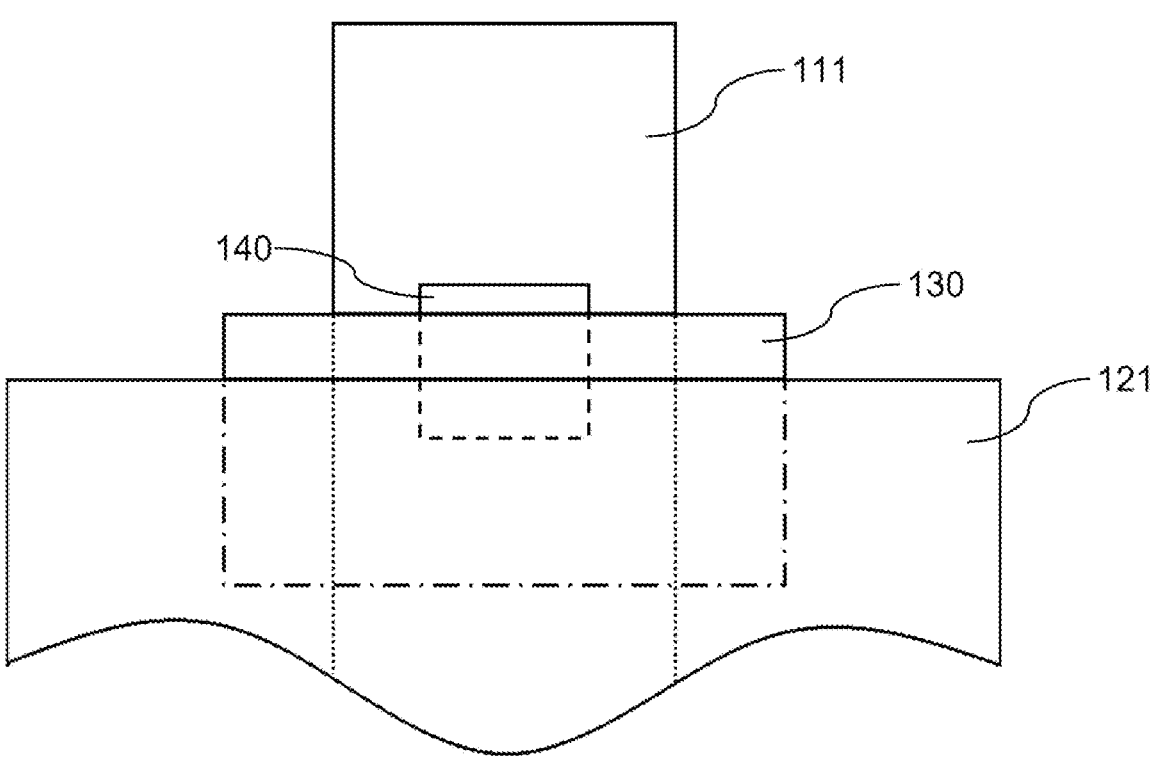
【FIG. 4】
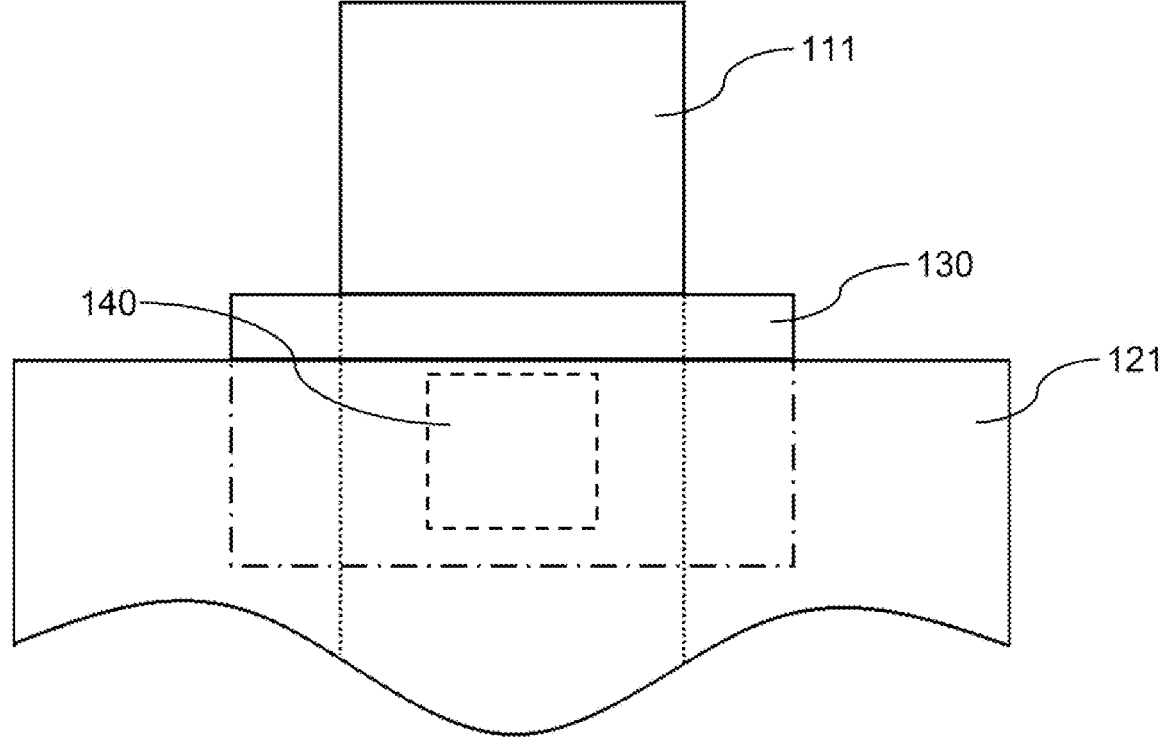

【FIG. 5】
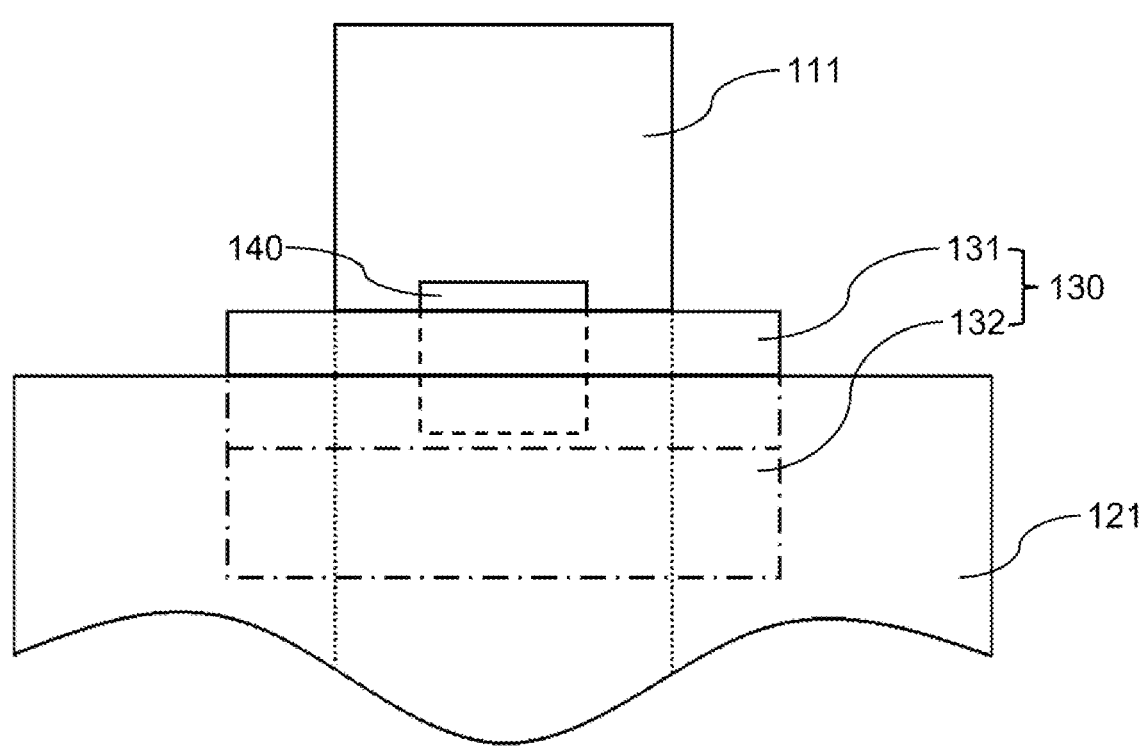

POUCH-SHAPED BATTERY CELL HAVING SAFETY ELEMENT PROVIDED BETWEEN ELECTRODE LEAD AND LEAD FILM

CROSS-REFERENCE TO RELATED APPLICATIONS

This application is a national phase entry under U.S.C. § 371 of International Application No. PCT/KR2022/012785 filed on Aug. 26, 2022, which claims the benefit of priority to Korean Patent Application No. 10-2021-0121677 filed on Sep. 13, 2021, the disclosures of which are incorporated herein by reference in their entireties.

TECHNICAL FIELD

The present invention relates to a pouch-shaped battery cell having a safety element provided between an electrode lead and a lead film, thereby preventing a risk of fire outbreak or explosion due to abnormality of the battery cell.

BACKGROUND ART

With technological development of mobile devices, such as smartphones, laptop computers, and digital cameras, and an increase in demand therefor, research on secondary batteries, which are capable of being charged and discharged, has been actively conducted. In addition, secondary batteries, which are energy sources substituting for fossil fuels causing air pollution, have been applied to an electric vehicle (EV), a hybrid electric vehicle (HEV), a plug-in hybrid electric vehicle (P-HEV), and an energy storage system (ESS).

There are a lithium ion battery, a lithium polymer battery, a nickel-cadmium battery, a nickel-hydride battery, and a nickel-zinc battery as secondary batteries that are widely used at present. The operating voltage of a unit secondary battery cell, i.e. a unit battery cell, is about 2.0V to 5.0V. When output voltage higher than the above operating voltage is required, therefore, a plurality of battery cells may be connected to each other in series to constitute a cell module assembly. In addition, cell module assemblies may be connected to each other in series or in parallel to constitute a battery module depending on required output voltage or charge and discharge capacities. In general, a battery pack is manufactured using at least one battery module by adding an additional component.

Depending on the shape of a case, battery cells may be generally classified into a prismatic battery cell, a cylindrical battery cell, and a pouch-shaped battery cell.

Thereamong, the pouch-shaped battery cell is generally manufactured using a pouch case having a laminate sheet structure including an inner layer, a metal layer, and an outer layer.

FIG. 1 is a view schematically showing a conventional pouch-shaped battery cell, wherein the conventional pouch-shaped battery cell is manufactured by receiving an electrode assembly 10 in a pouch case 20 together with an electrolytic solution and hermetically sealing an edge of the pouch case by thermal fusion to form a sealed portion 21.

In addition, a part of an electrode lead 11 connected to the electrode assembly 10 protrudes outwards from the pouch case 20 so as to be electrically connected to a busbar, and a lead film 30 is generally interposed between the electrode lead 11 and the pouch case 20 in order to improve electrical insulation and adhesion therebetween.

The pouch-shaped battery cell has an advantage in that the shape and size of the pouch-shaped battery cell can be changed as needed and the capacity ratio of the pouch-shaped battery cell can be increased but a disadvantage in that the pouch-shaped battery cell has relatively low resistance to fire outbreak or explosion.

At the time of manufacture of the pouch-shaped battery cell, therefore, various methods of improving safety thereof are used.

Thereamong, a method of interrupting the flow of current in a battery cell using an element, such as a fuse, when abnormality of the battery cell, such as overheating due to overcurrent, occurs is mainly used.

In such a method, an element configured to interrupt overcurrent is provided at each battery cell, whereby manufacturing cost is increased, and the capacity ratio of the battery cell is reduced. In addition, a relevant battery cell has a high energy state due to overcurrent even though the overcurrent is sensed and interrupted, whereby there is an additional risk of fire outbreak or explosion.

DISCLOSURE

Technical Problem

The present invention has been made in view of the above problems, and it is an object of the present invention to provide a pouch-shaped battery cell having a safety element provided between an electrode lead and a lead film, thereby preventing a risk of fire outbreak or explosion due to abnormality of the battery cell.

Technical Solution

A pouch-shaped battery cell according to the present invention to accomplish the above object includes an electrode assembly having an electrode lead joined thereto, a pouch case configured to receive the electrode assembly, the pouch case having a sealed portion for sealing formed at an outside thereof, and a lead film interposed between the electrode lead and an inner surface of the pouch case at the sealed portion, wherein the pouch-shaped battery cell includes a safety element interposed between the electrode lead and the lead film, the safety element being configured to absorb energy in the battery cell, thereby discharging the battery cell, when the battery cell is overheated to a predetermined temperature or higher.

Also, in the pouch-shaped battery cell according to the present invention, a part of the lead film may be exposed out of the sealed portion, and the lead film may be provided at each of opposite surfaces of the electrode lead.

Also, in the pouch-shaped battery cell according to the present invention, the safety element may be a sheet-shaped element made of a semiconductor material.

Also, in the pouch-shaped battery cell according to the present invention, the safety element may have a smaller thickness than the lead film.

Also, in the pouch-shaped battery cell according to the present invention, the safety element may be provided at each of opposite surfaces of the electrode lead.

Also, in the pouch-shaped battery cell according to the present invention, a part of the safety element may be exposed out of the lead film.

Also, in the pouch-shaped battery cell according to the present invention, the safety element may be located in the lead film.

Also, in the pouch-shaped battery cell according to the present invention, the lead film may include a first lead film configured to cover the safety element, a part of the first lead film being exposed out of the sealed portion, and a second lead film connected to the first lead film, the second lead film being located in the sealed portion.

Also, in the pouch-shaped battery cell according to the present invention, the first lead film may include a material having a lower melting point than the second lead film.

Also, in the pouch-shaped battery cell according to the present invention, the first lead film may be a film made of polyethylene (PE), and the second lead film may be a film made of polypropylene (PP).

In addition, a battery module according to the present invention includes the pouch-shaped battery cell according to the present invention.

In addition, a device according to the present invention includes the battery module according to the present invention.

Advantageous Effects

A pouch-shaped battery cell according to the present invention has an advantage in that a safety element is provided between an electrode lead and a lead film such that current in the battery cell is discharged when the battery cell is abnormal, whereby it is possible to prevent fire outbreak or explosion of the battery cell.

In addition, the pouch-shaped battery cell according to the present invention has an advantage in that, since the safety element is provided, it is possible to improve safety of the battery cell without a complicated process or design change.

DESCRIPTION OF DRAWINGS

FIG. 1 is a view schematically showing a conventional pouch-shaped battery cell.

FIG. 2 is a view schematically showing a pouch-shaped battery cell including a safety element according to an embodiment of the present invention.

FIG. 3 is an enlarged view showing a portion of the pouch-shaped battery cell including the safety element according to the embodiment of the present invention at which the safety element is located.

FIG. 4 is an enlarged view showing a portion of a pouch-shaped battery cell including a safety element according to another embodiment of the present invention at which the safety element is located.

FIG. 5 is an enlarged view showing a portion of a pouch-shaped battery cell having a first lead film and a second lead film according to a further embodiment of the present invention at which a safety element is located.

BEST MODE

In the present application, it should be understood that the terms "comprises," "has," "includes," etc. specify the presence of stated features, numbers, steps, operations, elements, components, or combinations thereof, but do not preclude the presence or addition of one or more other features, numbers, steps, operations, elements, components, or combinations thereof.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, a pouch-shaped battery cell according to the present invention will be described with reference to the accompanying drawings.

FIG. 2 is a view schematically showing a pouch-shaped battery cell including a safety element according to an embodiment of the present invention.

When describing the pouch-shaped battery cell 100 according to the present invention with reference to FIG. 2, the pouch-shaped battery cell 100 includes an electrode assembly 110, a pouch case 120, a lead film 130, and a safety element 140.

First, the electrode assembly 110 may be a jelly-roll type assembly, which is configured to have a structure in which a long sheet type positive electrode and a long sheet type negative electrode are wound in the state in which a separator is interposed therebetween, a stacked type assembly, which is configured to have a structure in which a rectangular positive electrode and a rectangular negative electrode are stacked in the state in which a separator is interposed therebetween, a stacked and folded type electrode assembly, which is configured to have a structure in which unit cells are wound using a long separation film, or a laminated and stacked type assembly, which is configured to have a structure in which battery cells are stacked in the state in which a separator is interposed therebetween and are then attached to each other; however, the present invention is not limited thereto.

Positive electrode and negative electrode tabs are formed at the electrode assembly 110, and positive electrode and negative electrode leads 111 are generally joined to the positive electrode and negative electrode tabs, respectively.

As shown in FIG. 2, the positive electrode and negative electrode leads 111 may be formed so as to protrude in opposite directions; however, the present invention is not limited thereto, and various disposition options thereof are possible. For example, the positive electrode and negative electrode leads 111 may protrude in the same direction.

The pouch case 120 receives the electrode assembly 110 and an electrolytic solution therein, and an edge of the pouch case, in which the electrode assembly 110 is received, is hermetically sealed by thermal fusion, whereby a sealed portion 121 is provided at the pouch case.

The pouch case 120 is generally configured to have a laminate sheet structure including an inner layer, a metal layer, and an outer layer. The inner layer is disposed in direct contact with the electrode assembly 110, and therefore the inner layer must exhibit high insulation properties and high resistance to an electrolytic solution. In addition, the inner layer must exhibit high sealability in order to hermetically seal the pouch case from the outside, i.e. a thermally-bonded sealed portion between inner layers must exhibit excellent thermal bonding strength.

The inner layer may be made of a material selected from among a polyolefin-based resin, such as polypropylene, polyethylene, polyethylene acrylate, or polybutylene, a polyurethane resin, and a polyimide resin, which exhibit excellent chemical resistance and high sealability.

The metal layer, which is disposed so as to abut the inner layer, corresponds to a barrier layer configured to prevent moisture or various kinds of gas from permeating into the battery from the outside. An aluminum thin film, which is lightweight and easily shapeable, may be used as a preferred material for the metal layer.

The outer layer is provided on the other surface of the metal layer. The outer layer may be made of a heat-resistant polymer that exhibits excellent tensile strength, resistance to moisture permeation, and resistance to air transmission such that the outer layer exhibits high heat resistance and chemical resistance while protecting the electrode assembly 110. As an example, the outer layer may be made of nylon or polyethylene terephthalate; however, the present invention is not limited thereto.

Meanwhile, the lead film 130 is located between the electrode lead 111 and the sealed portion 121 of the pouch case 120 to prevent the occurrence of short circuit between the electrode lead 111 and the metal layer of the pouch case 120 and to increase sealing force, thereby preventing leakage of the electrolytic solution.

The lead film 130 may include at least one material selected from among polyimide (PI), polypropylene (PP), polyethylene (PE), polyethylene terephthalate (PET), and an epoxy resin, each of which has high insulation properties and thermal fusibility. In addition, the lead film 130 may be generally configured such that a pair of films is located on opposite surfaces of the electrode lead 111 and parts of the films that do not abut the electrode lead 111 are joined to each other by thermal fusion so as to wrap the electrode lead 111. It is preferable for the lead film to be formed so as to protrude outwards from the pouch case 120 after sealing of the pouch case 120 in terms of prevention of short circuit.

Meanwhile, the pouch-shaped battery cell 100 according to the present invention further includes a safety element 140 disposed between the electrode lead 111 and the lead film 130 to absorb energy in the pouch-shaped battery cell 100, i.e. current, thereby discharging the pouch-shaped battery cell 100, when the pouch-shaped battery cell is overheated to a predetermined temperature or higher due to overcurrent.

It is preferable for the safety element 140 to be a sheet made of a semiconductor material that has low electrical conductivity at normal temperature and that gradually increases with an increase in temperature.

When the pouch-shaped battery cell 100 is normally operated, current hardly flows in the safety element 140 made of the semiconductor material due to low electrical conductivity thereof, compared to the electrode lead 111.

When the pouch-shaped battery cell 100 is overheated due to overcurrent, however, the temperature of the safety element 140 is increased, whereby the amount of current that flows in the safety element 140 is sharply increased.

As a result, current in the pouch-shaped battery cell 100 is forcibly discharged, whereby it is possible to prevent an additional risk of fire outbreak or explosion.

Additionally, when an excessive amount of current flows in the safety element 140, the temperature of the safety element 140 is increased due to heat generation by internal resistance, and such an increase in temperature may degrade the lead film 130, which serves to insulate between the electrode lead 111 and the pouch case 120, and the inner layer of the pouch case 120.

Consequently, short circuit may occur between the electrode lead 111 and the metal layer of the pouch case 120, whereby discharging of the pouch-shaped battery cell 100 may be further accelerated.

FIG. 3 is an enlarged view showing a portion of the pouch-shaped battery cell including the safety element according to the embodiment of the present invention at which the safety element is located, and FIG. 4 is an enlarged view showing a portion of a pouch-shaped battery cell including a safety element according to another embodiment of the present invention at which the safety element is located.

When describing positions at which the electrode lead 111 and the safety element 140 are provided with reference to FIGS. 3 and 4, a part of the safety element 140 may protrude outwards from the lead film 130, as shown in FIG. 3, or the safety element 140 may be provided so as to be completely inserted into the lead film 130 as shown in FIG. 4.

Since the degree of degradation of the lead film 130 is changed depending on contact area between the safety element 140 and the lead film 130 and heat generated from the safety element 140, it is possible to somewhat adjust the degree of degradation of the lead film 130 by properly adjusting the contact area.

Of course, the degree of degradation of the lead film 130 also depends on the material thereof.

The safety element 140 is located so as to partially or entirely overlap the sealed portion 121 of the pouch-shaped battery cell 100 and/or the lead film 130, and therefore it is preferable for the safety element to have as a small thickness as possible.

Specifically, it is preferable for the safety element 140 to have a thickness similar to or less than the thickness of the lead film 130, which covers the safety element.

In addition, although the safety element 140 is shown as being located at one surface of the electrode lead 111 in FIGS. 2 to 4, the pouch-shaped battery cell 100 according to the present invention may be configured such that a plurality of safety elements is provided at opposite surfaces of the electrode lead 111.

Meanwhile, although the case in which the lead film 130 is formed of a material uniform over the entirety of the lead film 130 is described by way of example in FIGS. 2 to 4 of the present invention, the lead film 130 according to the present invention may be formed of different materials depending on zone.

FIG. 5 is an enlarged view showing a portion of a pouch-shaped battery cell having a first lead film and a second lead film according to a further embodiment of the present invention at which a safety element is located.

When describing another example of the lead film 130 according to the present invention with reference to FIG. 5, a lead film 130 having two zones includes a first lead film 131, a part of which is exposed out of the sealed portion 121, the first lead film being disposed to cover the safety element 140, and a second lead film 132 connected to the first lead film, the second lead film being located in the sealed portion 121.

Here, the first lead film 131 is made of a material that has a lower melting point than the second lead film 132.

For example, the first lead film 131 may be made of polyethylene (PE), and the second lead film 132 may be made of polypropylene (PP).

When the lead film 130 having two zones is used, as described above, the first lead film 131 may be degraded at a lower temperature due to heat generated from the safety element 140. As a result, short circuit between the electrode lead 111 and the metal layer of the pouch case 120 may occur earlier, whereby discharging of the pouch-shaped battery cell 100 may be further accelerated.

When briefly describing a method of manufacturing the pouch-shaped battery cell 100 according to the present invention described above, the method includes a step of forming an electrode assembly 110 and a step of joining an electrode lead 111 to an electrode tab of the formed electrode assembly 110.

At this time, the electrode tab and the electrode lead 111 may be joined to each other using any of various known welding methods, such as resistance welding, ultrasonic welding, and laser welding.

Subsequently, a lead film 130 is located on the electrode lead 111, a safety element 140 is interposed therebetween, the electrode assembly 110 is received in a pouch case 120 such that a part of the electrode lead 111 is exposed, an electrolytic solution is injected, and the pouch case is hermetically sealed to form a sealed portion 121, whereby the pouch-shaped battery cell 100 is formed.

That is, the same process as the conventional pouch-shaped battery cell manufacturing method may be performed except that the safety element 140 is provided, whereby additional production cost may be greatly reduced and it is possible to manufacture a pouch-shaped battery cell 100 with improved safety.

In addition, a battery module or a battery pack including the pouch-shaped battery cell 100 including the safety element 140 according to the present invention may be manufactured, and the manufactured battery module or battery pack may be used as a power supply source for various kinds of electronic equipment and various devices, such as an electric vehicle (EV), a hybrid electric vehicle (HEV), and a plug-in hybrid electric vehicle (P-HEV).

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and the technical idea of the present invention, and it will be obvious that such changes and modifications fall within the scope of the appended claims.

DESCRIPTION OF REFERENCE NUMERALS

100: Pouch-shaped battery cell
110: Electrode assembly
111: Electrode lead
120: Pouch case
121: Sealed portion
130: Lead film
131: First lead film
132: Second lead film
140: Safety element

The invention claimed is:

1. A pouch-shaped battery cell comprising:
an electrode assembly having an electrode lead joined thereto;
a pouch case configured to receive the electrode assembly, the pouch case having a sealed portion for sealing formed at an outside thereof; and
a lead film interposed between the electrode lead and an inner surface of the pouch case at the sealed portion, wherein
the pouch-shaped battery cell includes a safety element interposed between the electrode lead and the lead film, the safety element being configured to absorb energy in the battery cell, thereby discharging the battery cell, when the battery cell is heated to a predetermined temperature or higher, and wherein the safety element increases in conductivity as temperature increases.

2. The pouch-shaped battery cell according to claim 1, wherein
a part of the lead film is exposed out of the sealed portion, and
the lead film is provided at opposite surfaces of the electrode lead.

3. The pouch-shaped battery cell according to claim 1, wherein the safety element is a sheet-shaped element made of a semiconductor material.

4. The pouch-shaped battery cell according to claim 3, wherein the safety element has a smaller thickness than the lead film.

5. The pouch-shaped battery cell according to claim 1, wherein the safety element is provided at opposite surfaces of the electrode lead.

6. The pouch-shaped battery cell according to claim 1, wherein a part of the safety element is at least partially exposed out of the lead film.

7. The pouch-shaped battery cell according to claim 1, wherein the safety element is located entirely in the lead film.

8. The pouch-shaped battery cell according to claim 1, wherein the lead film comprises:
a first lead film configured to cover the safety element, a part of the first lead film being exposed out of the sealed portion; and
a second lead film connected to the first lead film, the second lead film being located in the sealed portion.

9. The pouch-shaped battery cell according to claim 8, wherein the first lead film includes a material having a lower melting point than the second lead film.

10. The pouch-shaped battery cell according to claim 9, wherein
the first lead film is a film made of polyethylene (PE), and
the second lead film is a film made of polypropylene (PP).

11. A battery module comprising the pouch-shaped battery cell according to claim 1.

12. A device comprising the battery module according to claim 11.

13. A pouch-shaped battery cell, comprising:
an electrode assembly having an electrode lead joined thereto;
a pouch case housing the electrode assembly, the pouch case having a sealed portion for sealing formed at an outside thereof;
a lead film interposed between the electrode lead and an inner surface of the pouch case at the sealed portion; and
a safety element interposed between the electrode lead and the lead film, the safety element including a semiconductor material configured to absorb energy in the battery cell, and subsequently discharge energy from the battery cell, when the battery cell is heated to a predetermined temperature,
wherein the safety element increases in conductivity as temperature increases.

14. The pouch-shaped battery cell according to claim 13, wherein the safety element is sheet-shaped and has a thickness that is equal to or less than the lead film.

15. The pouch-shaped battery cell according to claim 13, wherein the safety element is provided at opposite surfaces of the electrode lead.

16. The pouch-shaped battery cell according to claim 13, wherein a part of the safety element extends out of the lead film.

17. The pouch-shaped battery cell according to claim 13, wherein the safety element is located entirely in the lead film.

18. The pouch-shaped battery cell according to claim 13, wherein the lead film comprises:

a first lead film configured to at least partially cover the safety element, a part of the first lead film being exposed out of the sealed portion; and a second lead film connected to the first lead film, the second lead film being located entirely within the sealed portion and having a higher melting point than the first least film.

19. The pouch-shaped battery cell according to claim 18, wherein the first lead film is a film made of polyethylene (PE), and the second lead film is a film made of polypropylene (PP).

\* \* \* \* \*